United States Patent [19]

Flatz

[11] 3,718,735
[45] Feb. 27, 1973

[54] PROCESS FOR THE PRODUCTION OF PERBORATES

[75] Inventor: Wolfgang Flatz, Basel, Switzerland

[73] Assignee: Sandoz Ltd., Basel, Switzerland

[22] Filed: July 6, 1970

[21] Appl. No.: 52,755

[30] Foreign Application Priority Data

July 29, 1969 Switzerland....................11519/69
Sept. 5, 1969 Switzerland....................13484/69
Sept. 10, 1969 Switzerland....................13650/69

[52] U.S. Cl.................................................423/281
[51] Int. Cl...............................................C01b 15/12
[58] Field of Search....................................23/59, 60

[56] References Cited

UNITED STATES PATENTS

| | | | |
|---|---|---|---|
| 2,623,856 | 12/1952 | Sanders | 23/59 X |
| 3,309,170 | 3/1967 | Griswold | 23/59 |
| 3,454,357 | 7/1969 | Rhees et al. | 23/59 X |
| 2,097,411 | 10/1937 | Corkill | 23/59 |
| 3,336,103 | 8/1967 | Schumacher et al. | 23/59 |

FOREIGN PATENTS OR APPLICATIONS 1,504,848   10/1967   France....................23/60

Primary Examiner—Herbert T. Carter
Attorney—G. D. Sharkin, T. C. Doyle, R. S. Honor, W. F. Jewell, T. O. McGovern, R. E. Vila and F. H. Weinfeldt

[57] ABSTRACT

This invention relates to a process for the production of perborates by the reaction of dried borates, the particles of which have an inner surface area of at least 0.4 m²/g, with hydrogen peroxide in an organic solvent.

5 Claims, No Drawings

PROCESS FOR THE PRODUCTION OF PERBORATES

This invention relates to a process for the production of perborates by the reaction of borates, the particles of which have an inner surface area of at least 0.4 m²/g, with hydrogen peroxide in an organic solvent.

It is known, for example from Belgian Patents 681,366 and 689,834, that perborates, preferably sodium perborate, can be obtained by reacting dried borates with hydrogen peroxide in an organic solvent. It is important that the reaction should be carried out in the presence of very small amounts of water. The water may be bound to the borate in the form of water of crystallization or crystal water, or it may be dissolved in the organic solvent. Dried sodium metaborate is widely used to produce perborates by this process.

The tetrahydrate crystallizes from aqueous solutions of sodium metaborate at temperatures around 20°C. Hitherto the dihydrate has been obtained from this product by drying at temperatures up to 90°C and the less hydrated products by drying at temperatures above 90°C. In this way, however, complete dehydration of sodium metaborate is practical only at temperatures higher than 250°C. In this drying technique the crystal water escapes very slowly and the dried product does not differ materially from the starting product in its inner surface characteristics, nor, consequently, in the bulk density. For this reason one known process on an industrial scale makes use of crystallizers, mechanical dehydrating devices and a calcining oven. In another process sodium metaborate solutions are heated until no more than 2 moles of water per mole of borate are present; the solution, or more properly the melt, is then cooled on a drum and allowed to solidify. The borates thus obtained have a water content invariably greater than 1.75 moles $H_2O$ per mole $NaBO_2$. Thirdly and lastly, sodium metaborates containing 1 to 4 moles of crystal water per mole of borate are produced by spraying stoichiometric amounts of aqueous sodium hydroxide solution on sodium tetraborate, which does not however yield a product of homogeneous chemical composition. These known processes invariably result in products of very coarse grain, which usually have to be ground before further use. After grinding, the product is always found to have a grain spectrum of very wide size distribution, with compact discrete grains.

Since the reaction of sodium borates with hydrogen peroxide takes place on the crystal surface of the borate, attempts have been mode to attain to the optimum in reaction speed and yield of high-percentage borate by superfine grinding of the borate. As yet, this approach has not led to technically satisfactory reaction times.

An attempt has now been made to produce sodium metaborate with a maximum crystal water content of 2 moles $H_2O$ per mole of $NaBO_2$ by drying an aqueous solution of sodium metaborate in an atomizer, where the solution is sprayed into a stream of hot gas, with the aim of obtaining products of greater inner surface area. These trails resulted in light-weight products with a content of crystal water between the lower and upper limits of approximately 0.25 mole and 1.1 moles $H_2O$ per mole of $NaBO_2$. The inner surface area of these atomizer dried borates is generally greater than 1 m²/g; values of the order of 1.5 to 2.5 m²/g are attainable with ease.

By using contact heat for drying sodium metaborate, with the application of vacuum, products with an inner surface area of 0.5 – 0.7 m²/g are readily obtainable. Cyclone driers are capable of yielding homogeneous products with a larger inner surface area.

The conditions in the drying of commercial borax and the other borates which can be used for producing perborates are similar to those for metaborate.

It has now been found that borates with an inner surface area greater than 0.4 m²/g are particularly well suited for the production of perborates by the process in which an organic compound containing at least two hydrogen atoms oxidizable with the formation of hydrogen peroxide is oxidized in an organic solvent or solvent mixture and simultaneously or subsequently reacted with solid borates in the presence of small amounts of water. Borates with an inner surface area between 1.5 and 2.5 m²/g are especially suitable.

Products with such a large inner surface area react more rapidly with hydrogen peroxide in organic solvents than the finely divided borates obtained by grinding. In the same reaction time these very finely divided, usually scaly products form perborates in substantially higher yield; as an associated effect the amounts of decomposition products are smaller, which is important for recovery of the solvent; and finally the perborates are less subject to discoloration than perborates produced from borates of higher bulk density.

For drying by the atomizing technique, sodium metaborate solutions with a concentration of about 1.8 to 10 moles of water per mole of borate can be used, although it is economically of advantage to work with solutions of concentrations of 2.5 to 4 moles of water per mole of borate. It is best to prepare the solution by evaporation of a dilute solution, and the normal practice is to run it hot into the atomizer drier, i.e., at temperatures in the region of 95°C. The atomizer must therefore be a type designed to accommodate solutions and melts at temperatures of about 100°C.

The crystal form of the resulting sodium metaborate depends on the temperature of the stream of hot gas which, as previously stated, is directed through the reaction mixture. If the gas temperature is higher than about 150°C on entry and above about 120°C on exit, crystals of scaly, fissured structure are normally obtained. These products therefore have a very large surface area and, accordingly, a low bulk density, which is generally less than 0.3 g/cm³ and is optimally of the order of 0.04–0.1 g/cm³. The grain size of these coarse blown products is in the region of 1 cm diameter. They are very hydroscopic.

If the starting product is sodium tetraborate it is advantageous to prepare the solution at a concentration of at least 10 moles of water per mole of tetraborate; about 200 moles of water per mole of tetraborate can be given as the upper limit. For economical operation, however, a concentration of 21 to about 60 moles of $H_2O$ per mole of $Na_2B_4O_7$ is best. These solutions can be prepared, for example, by adding water to a commercial grade of tetraborate and filtering the solution. They can be conveyed hot into the atomizer drier, i.e., at temperatures from about 40°C to about 150°C.

The stream of gas used in the process can be passed through parallel with the path of exit of the liquid from the nozzle, or in the opposite direction. Normally few specifications are made fro the gas; its mixture content should be low and it should be free from dust. In full-scale production of stream of hot air, filtered if necessary, is sufficient. If a product with a range of small grain sizes is desired, as is generally the case, the hot gas jet can be directed into the batch so that a vortex is created in which the solid grains collide against each other and the walls of the machine and are broken down by attrition (comminution in a cyclone and/or with pneumatic promoting effect). Generally, these conditions give rise to a product of small grain size and even size distribution. A series of such trials yielded a product with an arithmetic mean grain size of less than 40 microns and a granulation parameter n greater than 2.1, more specifically about 2.3 (determinations as in German Industrial Standard 4190, Draft of March 1966).

EXAMPLE 1

A solution of sodium metaborate in water (in the ratio of 4 moles of $H_2O$ to 1 mole of $NaBO_2$), heated to about 95°C, is conveyed through a standard atomization apparatus into an atomizer drier. Air at an entry temperature of 200°C is passed through in the same direction as the path of flow of the solution, the temperature of the spent air being 150°C. A puffy product resembling snowflakes is formed which is of low bulk density and has a crystal water content of 0.6 moles $H_2O/1$ mole $NaBO_2$. Having passed a cyclone, a product is obtained with a bulk density of 52 kg/m³ and an inner surface area of 1.8 m²/g.

EXAMPLE 2

A solution of sodium metaborate in water (2.9 moles of $H_2O$ to 1 mole of $NaBO_2$) at about 95°C is fed through an atomizing apparatus into an atomizer drier. The entry and exit temperatures of the air are 190° and 140°C, respectively, and its direction of flow is parallel to that of the solution. At the end of the drying zone cold air is blown in to cool the product and break down the grains by attrition. A very fine final product is obtained which contains 0.8 mole of crystal water per mole of sodium metaborate. Its bulk density is 65 kg/m³ and its inner surface area 1.0 m²/g.

) is directed through an atomizing apparatus into an atomizer drier, where a countercurrent of air, entry temperature 600°C, exit temperature 370°C, is passed through it. A puffy product like snowflakes is formed. After comminution in cyclone it is obtained with a bulk density of 30 kg/m³, an inner surface area of 3.5 m²/g, a water content of 0.56 mole $H_2O$ per mole of $Na_2B_4O_7$ and a mean grain size of about 37 microns.

EXAMPLE 7

An aqueous solution of sodium tetraborate (23 moles $H_2O$ to 1 mole $Na_2B_4O_7$) at about 100°C is conveyed through an atomizer and atomizer drier. A stream of air is injected at 310°C to pass through in the same direction as the solution and escape at 210°C. After comminution in a cyclone a very fine product is obtained containing 1.2 moles $H_2O$ to 1 mole $Na_2B_4O_7$. The bulk density of this sodium tetraborate is 45 kg/m³ and its inner surface area 2.9 m²/g.

EXAMPLE 8

A solution of sodium tetraborate in water (33.8 moles $H_2O$ to 1 mole $Na_2B_4O_7$) at about 85°C is directed through an atomizing apparatus into an atomizer drier. A stream of air enters at 210°C and escapes at about 130°C after passing through the solution in the concurrent direction. The dried tetraborate is comminuted in a cyclone, which gives a very fine product containing 2.2 moles of $H_2O$ per 1 mole of $Na_2B_4O$? Its bulk density is 85 kg/m³ and the inner surface area 0.6 m²/g.

EXAMPLE 9

A solution of 150 parts by weight containing 0.297 mole of 2-ethylanthrahydroquinone, 0,103 mole of 2-ethylanthraquinone and 0.290 mole of water per kilogram is prepared with acetic cyclohexylester as solvent. The solution is circulated and 3.49 parts of a sodium metaborate produced by spray drying are entered. The resulting suspension is treated with an air current at a reaction temperature of 52°C. The rate of flow of the air is 520 Nl/hour and its moisture content is calculated so that the water content of the solution remains constant. The starting sodium metaborate contains per mole 0.70 mole of water (analytical value 12.77 gram atoms sodium per kilogram), its inner surface is 1.6 m²/g. After 20 minutes reaction time the solid is separated, since the circulated solution then contains only 0.006 mole of hydrogen peroxide per kilogram. The solid is filtered, the filtercake washed several times Further trials were carried out as described in Example 1, the differences relative to that Example being as follows:

| Example No. | Temperature of solution, °C. | Water content of solution, moles $H_2O$/moles $NaBO_2$ | Temperature, °C. Incoming air | Temperature, °C. Spent air | Water content | Air flow | Bulk density, kg./m.³ | Inner surface area, m.²/g. |
|---|---|---|---|---|---|---|---|---|
| 3 | 110 | 4 | 150 | 120 | 1.1 mole per mole $NaBO_2$ | Concurrent | 85 | 0.6 |
| 4 | 110 | 2.6 | 360 | 200 | 0.4 mole per mole $NaBO_2$ | Concurrent | 40 | 2.9 |
| 5 | 110 | 2.8 | 600–660 | 270 | 0.3 mole per mole $NaBO_2$ | Countercurrent | 32 | 3.5 |

EXAMPLE 6

At about 100°C a solution of sodium tetraborate in water (in the rate of 23.1 moles of $H_2O$ to 1 of $Na_2B_4O_7$ with benzene and freed from adhering residual benzene by short evacuation. The yield is 4.66 parts of a product containing 9.55 gram atoms of sodium and 9.28 gram atoms of hydrogen peroxide, which is equivalent to 14.8 percent active oxygen. In relation to the starting 2-ethylanthrahydroquinone this corresponds to a yield of about 97 percent and a loss of aBout 1 percent.

COMPARATIVE EXAMPLE

A sodium metaborate is dried at 250°C in a drying cabinet to 0.70 mole $H_2O$ per mole of borate (analytical value 12.75 gram atoms of sodium per kilogram) and ground to a mean grain size of 45 microns. 3.49 parts of this sodium metaborate are reacted by the procedure and under the condition of Example 9. This results in 4.09 parts of the product containing 10.88 gram atoms of sodium and 6.87 gram atoms of hydrogen peroxide, which is equivalent to an active oxygen content of 11.0. Relative to the starting 2-ethylanthrahydroquinone, this corresponds to a yield of approximately 63 percent and a loss of about 6 percent.

Approximately the same results are obtained when the sodium metaborate is added to the solution after its air treatment.

Having thus disclosed, the invention what I claim is:

1. In a process for producing perborate wherein an organic compound, containing at least two hydrogen atoms oxidizable with the formation of hydrogen peroxide, is oxidized in organic solvent and reacted with solid borate in the presence of a small amount of water, the improvement wherein the borate is spray dried perborate precursor having an inner surface area greater than 0.4 m²/g and a content of crystal water between 0.25 and 1.1 mole of borate.

2. A process according to claim 1 wherein the borate has an inner surface area between 1.5 and 2.5 m²/g.

3. A process according to claim 1 wherein the borate is a metaborate.

4. A process according to claim 1 wherein the borate is borax.

5. A process according to claim 1 wherein the borate has an arithmetic mean grain size of less than 40 microns.

* * * * *